US008773459B2

(12) United States Patent
Jiao et al.

(10) Patent No.: US 8,773,459 B2
(45) Date of Patent: Jul. 8, 2014

(54) 3-D CLIPPING IN A GRAPHICS PROCESSING UNIT

(75) Inventors: Guofang Jiao, San Diego, CA (US); Chun Yu, San Diego, CA (US); Lingjun Chen, San Diego, CA (US); Yun Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/524,946

(22) Filed: Jun. 15, 2012

(65) Prior Publication Data

US 2012/0256921 A1 Oct. 11, 2012

Related U.S. Application Data

(63) Continuation of application No. 11/551,900, filed on Oct. 23, 2006, now Pat. No. 8,212,840.

(51) Int. Cl.
*G09G 5/00* (2006.01)
*G06T 1/20* (2006.01)
*G06T 15/30* (2011.01)
*G06T 19/00* (2011.01)
*G06T 11/40* (2006.01)
*G06T 15/00* (2011.01)
*G06T 11/60* (2006.01)

(52) U.S. Cl.
CPC . *G06T 1/20* (2013.01); *G06T 15/30* (2013.01); *G06T 19/00* (2013.01); *G06T 11/40* (2013.01); *G06T 15/005* (2013.01); *G06T 11/60* (2013.01)
USPC ........... 345/620; 345/619; 345/621; 345/503; 345/519; 345/561; 345/418; 345/419; 345/420; 345/421; 345/422; 345/423; 345/424; 345/426; 345/427

(58) Field of Classification Search
CPC ......... G06T 11/60; G06T 15/30; G06T 19/00; G06T 11/40; G06T 1/20; G06T 15/005
USPC .......................... 345/619–620, 418–427, 561
See application file for complete search history.

(56) References Cited

U.S. PATENT DOCUMENTS 5,777,625 A 7/1998 Rossin
6,052,128 A * 4/2000 Narayanaswami et al. ... 345/620

(Continued)

FOREIGN PATENT DOCUMENTS

JP 2001243494 A 9/2001
JP 2002352263 A 12/2002
JP 2004102841 A 4/2004

OTHER PUBLICATIONS

International Search Report—PCT/US07/082261, International Search Authority—European Patent Office May 7, 2008.

(Continued)

*Primary Examiner* — Jin-Cheng Wang
(74) *Attorney, Agent, or Firm* — James R. Gambale, Jr.

(57) ABSTRACT

A graphics processing unit (GPU) efficiently performs 3-dimensional (3-D) clipping using processing units used for other graphics functions. The GPU includes first and second hardware units and at least one buffer. The first hardware unit performs 3-D clipping of primitives using a first processing unit used for a first graphics function, e.g., an ALU used for triangle setup, depth gradient setup, etc. The first hardware unit may perform 3-D clipping by (a) computing clip codes for each vertex of each primitive, (b) determining whether to pass, discard or clip each primitive based on the clip codes for all vertices of the primitive, and (c) clipping each primitive to be clipped against clipping planes. The second hardware unit computes attribute component values for new vertices resulting from the 3-D clipping, e.g., using an ALU used for attribute gradient setup, attribute interpolation, etc. The buffer(s) store intermediate results of the 3-D clipping.

27 Claims, 9 Drawing Sheets

(56) References Cited

U.S. PATENT DOCUMENTS

| | | | |
|---|---|---|---|
| 6,052,129 | A | 4/2000 | Fowler et al. |
| 6,359,630 | B1 | 3/2002 | Morse et al. |
| 6,686,924 | B1 | 2/2004 | Mang et al. |
| 6,897,871 | B1 * | 5/2005 | Morein et al. ............... 345/501 |
| 6,919,908 | B2 | 7/2005 | Munshi et al. |
| 7,280,112 | B1 * | 10/2007 | Hutchins ....................... 345/561 |
| 7,292,242 | B1 * | 11/2007 | Wittenbrink et al. ......... 345/421 |
| 7,298,375 | B1 | 11/2007 | Hutchins |
| 7,420,557 | B1 | 9/2008 | Moreton |
| 7,439,988 | B1 | 10/2008 | Parikh et al. |
| 7,466,322 | B1 | 12/2008 | Moreton et al. |
| 8,212,840 | B2 | 7/2012 | Jiao et al. |
| 2005/0253873 | A1 * | 11/2005 | Hutchins et al. .............. 345/660 |
| 2006/0053189 | A1 * | 3/2006 | Mantor ......................... 708/490 |
| 2006/0252429 | A1 | 11/2006 | Chen et al. |

OTHER PUBLICATIONS

Schneider et al, "Efficient Polygon Clipping for an SIMD Graphics pipeline",, IEEE Transactions on Visualization and Computer Graphics, 1998, 4(3), 272-285.

Shuhei Uemura et al., "Shader Analysis, Plastics that Create Real Glare," CG World, Works Corporation Inc., Japan, Oct. 1, 2003, vol. 62, chap. 2, pp. 74-75.

Written Opinion—PCT/US07/082261, International Searching Authority—European Patent Office May 7, 2008.

* cited by examiner

3-D CLIPPING IN A GRAPHICS PROCESSING UNIT

CROSS-REFERENCE TO RELATED APPLICATIONS

This application is a continuation of U.S. patent application Ser. No. 11/551,900 filed Oct. 23, 2006. The entirety of the aforementioned application is herein incorporated by reference.

BACKGROUND

I. Field

The present disclosure relates generally to electronics, and more specifically to techniques for performing 3-D clipping in a graphics processing unit (GPU).

II. Background

Graphics processing units (GPUs) are specialized hardware units used to render 2-dimensional (2-D) and/or 3-dimensional (3-D) images for various applications such as video games, graphics, computer-aided design (CAD), simulation and visualization tools, imaging, etc. A 3-D image may be modeled with surfaces, and each surface may be approximated with primitives. Primitives are basic geometry units and may include triangles, lines, etc. A GPU may perform various graphics operations such as transformation, rasterization, shading, blending, etc. to render a 3-D image. These graphics operations may be computationally intensive. Furthermore, the number of primitives used to represent the 3-D image may be large, e.g., in the millions. Much processing and memory resources may thus be consumed to perform computation on a large quantity of geometry data in order to render the 3-D image.

3-D clipping may be performed to identify and discard primitives that are not visible and thus do not need to be rendered Improved performance may be achieved by omitting computation for primitives that are discarded. However, 3-D clipping is itself a complex operation. A GPU may have dedicated hardware to perform all 3-D clipping operations. However, such dedicated 3-D clipping hardware would increase the cost and power consumption of the GPU, which may be undesirable for certain applications such as mobile and handheld devices. The use of dedicated 3-D clipping hardware may be avoided by performing 3-D clipping in software, which may be executed on a central processing unit (CPU), a digital signal processor (DSP), etc. However, performing 3-D clipping using a CPU or DSP, which is also used for other purposes, may raise other issues such as higher loading on a data bus used to transport primitive data and 3-D clipping results, synchronization between primitives sent out for 3-D clipping and other primitives to be rendered, etc.

SUMMARY

A graphics processing unit (GPU) that efficiently performs 3-D clipping using one or more processing units used for other graphics functions is described herein. The GPU may provide improved performance by performing 3-D clipping in hardware, reduce disruption to a 3-D graphics pipeline by not having to call a CPU or DSP to perform 3-D clipping, and provide other benefits.

In one design, the GPU includes first and second hardware units and at least one buffer. The first hardware unit performs 3-D clipping of primitives using a first processing unit used for a first graphics function, e.g., an arithmetic logic unit (ALU) used for triangle setup, depth gradient setup, etc. The first hardware unit may perform 3-D clipping by (a) computing clip codes for each vertex of each primitive, (b) determining whether to pass, discard or clip each primitive based on the clip codes for all vertices of the primitive, and (c) clipping each primitive to be clipped against clipping planes. The second hardware unit computes attribute component values for new vertices resulting from the 3-D clipping. The second hardware unit uses a second processing unit used for a second graphics function, e.g., an ALU used for attribute gradient setup, attribute interpolation, etc. The buffer(s) store intermediate results of the 3-D clipping by the first hardware unit.

Various aspects and features of the disclosure are described in further detail below.

DETAILED DESCRIPTION

A 3-D image may be represented with primitives, e.g., triangles, lines, other polygons, etc. Each primitive is defined by one or more vertices e.g., three vertices for a triangle. Each vertex is associated with various attributes such as space coordinates, color, texture coordinates, etc. Each attribute may have up to four components. For example, space coordinates may be given by either three components x, y and z or four components x, y, z and w, where x and y are horizontal and vertical coordinates, z is depth, and w is a homogeneous coordinate. Color may be given by three components r, g and b or four components r, g, b and a, where r is red, g is green, b is blue, and a is a transparency factor that determines the transparency of a pixel. Texture coordinates are typically given by horizontal and vertical coordinates, u and v. A vertex may also be associated with other attributes.

Figure 1:
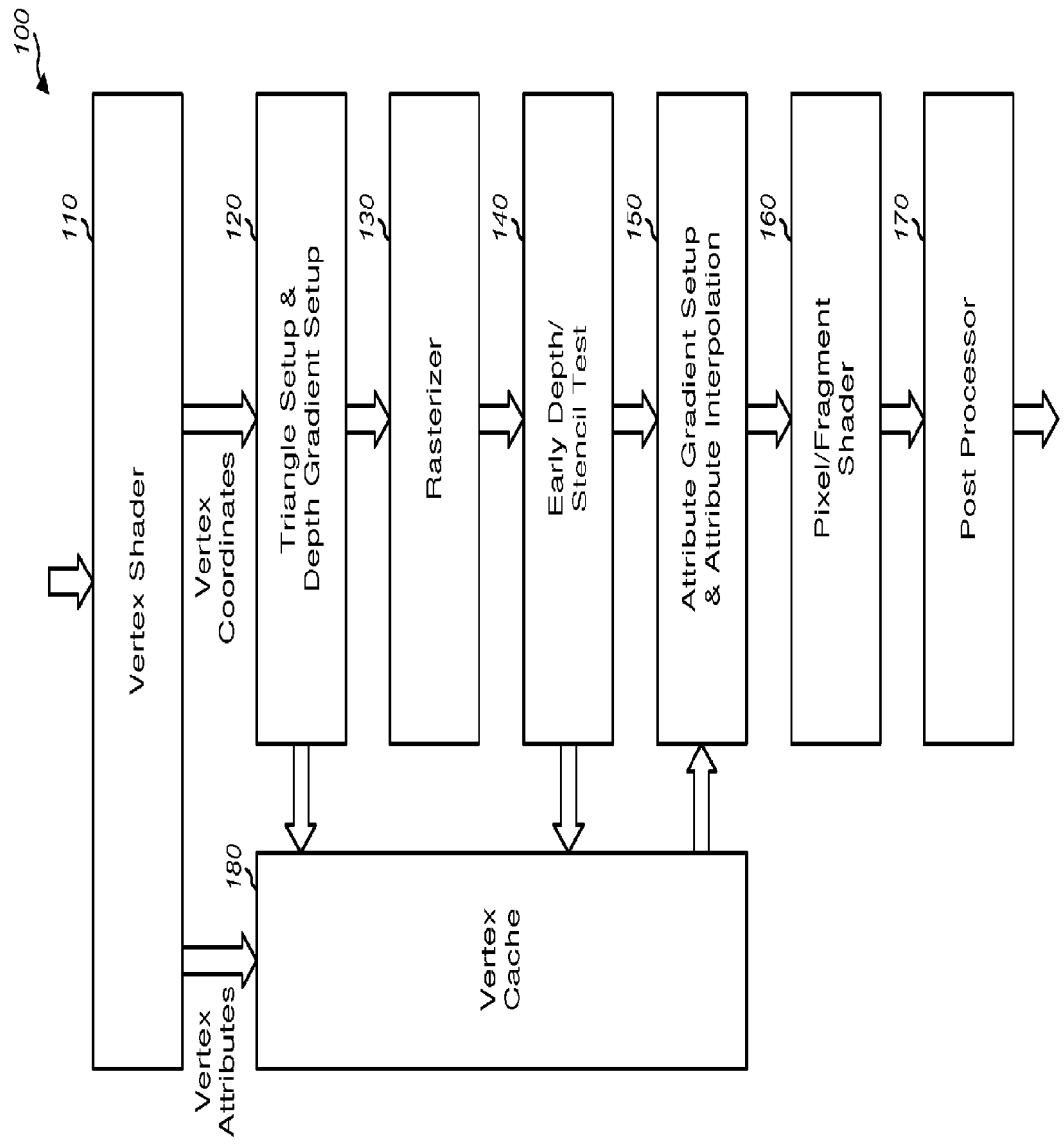
FIG. 1 shows a 3-D graphics pipeline for a GPU without 3-D clipping.

FIG. 1 shows a block diagram of a 3-D graphics pipeline for a GPU 100. A vertex shader 110 performs vertex processing on geometry data, which may comprise primitives such as triangles and lines. For example, vertex shader 512 may calculate light values for vertices, perform blending for geometry, etc. Vertex shader 110 may also determine the coordinates (e.g., x, y, z, w) and attribute component values of each vertex, provide vertex coordinates to a triangle setup and depth (z) gradient setup unit 120, and provide vertex attribute component values to a vertex cache 180. Vertex cache 180 stores the attribute component values and possibly other data for vertices and primitives.

Unit 120 computes parameters for the subsequent rasterization process. For example, unit 120 may perform viewport transformation to convert primitives from a clipping coordinate system (or clipping space) to a screen coordinate system (or screen space). Clipping space is a normalized homogeneous coordinate system with four dimensions x, y, z, w. Screen space is a 3-dimension coordinate system for a display screen or some other output device. Unit 120 may also perform scissoring to discard objects not within a scissoring window, back face culling to discard primitives on the backside of objects, etc. Unit 120 may perform triangle/primitive setup and compute coefficients of linear equations for the edge(s) of each primitive, coefficients for depth (z) gradient, etc. A rasterizer 130 decomposes each primitive into pixels and generates screen coordinates for each pixel.

An early depth/stencil test unit 140 may perform stencil test for pixels, if enabled, to determine whether the pixels should be rendered or discarded. The terms "discard", "drop" and "reject" are synonymous. The terms "pass" and "accept" are also synonymous. Unit 140 may compare a stencil value stored in a stencil buffer (not shown in FIG. 1) for a pixel against a reference value and either pass or discard the pixel based on the comparison result. Unit 140 may also perform a depth test (which is also called a z test) on pixels, if applicable, to determine whether the pixels should be rendered or discarded. Unit 140 may compare the z value for a pixel (the current z value) against a corresponding z value in a z buffer (the stored z value), pass the pixel and update the z buffer and possibly the stencil buffer if the current z value is closer/nearer than the stored z value, and discard the pixel if the current z value is further back than the stored z value.

An attribute gradient setup and attribute interpolation unit 150 interpolates attribute component values for vertices of primitives to obtain attribute component values for pixels within the primitives. Unit 150 may first compute parameters for attribute interpolation based on attribute component values of vertices. These parameters may be attribute gradients or coefficients of linear equations for attribute interpolation. Unit 150 may then compute attribute component values for each pixel within each primitive based on that pixel's screen coordinates and the interpolation parameters.

A pixel/fragment shader 160 may perform various graphics operations on pixels and fragments. A fragment is a pixel and its associated information. For example, pixel/fragment shader 160 may perform texture mapping, if enabled, to apply texture to pixels. Texturing is achieved by modifying the color of a pixel with the color of a texture image at the location indicated by that pixel's texture coordinates. A post processor 170 may perform other graphics operations such as alpha test, fog blending, alpha blending, logic operation, dithering operation, etc. on each fragment. Post processor 170 provides output pixels to a color buffer for presentation on a display device (both not shown in FIG. 1).

GPU 100 does not have dedicated 3-D clipping hardware, which may be costly because of the complex computation required for 3-D clipping and may not be justified if only a small percentage of primitives are clipped. In this case, 3-D clipping may be performed in software executed on a CPU or DSP. After completing vertex processing, GPU 100 may send primitive data to the CPU or DSP for 3-D clipping, if necessary. GPU 100 may then wait for 3-D clipping results from the CPU or DSP, which would waste GPU resources while the GPU is idle. Alternatively, GPU 100 may process new primitives and store the results in a buffer. Upon receiving the 3-D clipping results with new primitives from the CPU or DSP, GPU 100 may send the new primitives to the next stage and bypass the primitives in the buffer. This avoids wasting GPU resources while waiting for the 3-D clipping results but requires more buffering and may cause synchronization and other issues.

Figure 2:
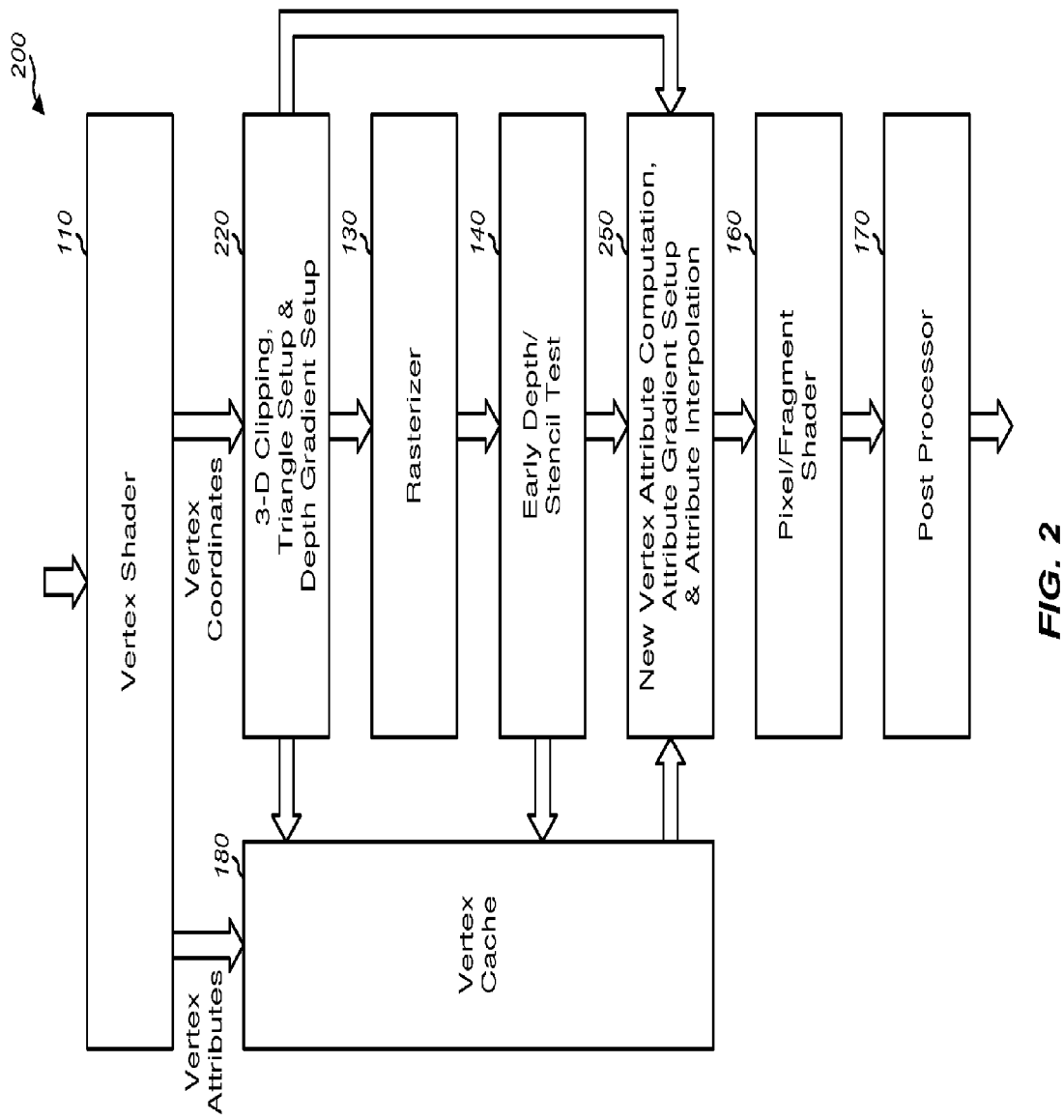
FIG. 2 shows a 3-D graphics pipeline for a GPU with 3-D clipping.

FIG. 2 shows a block diagram of a 3-D graphics pipeline for a GPU 200 that efficiently supports 3-D clipping using processing units for other graphics functions. GPU 200 includes vertex shader 110, rasterizer 130, early depth/stencil test unit 140, pixel/fragment shader 160, post processor 170, and vertex cache 180 that operate as described above for FIG. 1. GPU 200 further includes (a) a 3-D clipping, triangle setup, and depth gradient setup unit 220 in place of unit 120 in FIG. 1 and (b) a new vertex attribute computation, attribute gradient setup, and attribute interpolation unit 250 in place of unit 150 in FIG. 1.

Unit 220 performs 3-D clipping for primitives using a processing unit (e.g., an ALU) used for triangle setup and depth gradient setup. For 3-D clipping, unit 220 determines whether to pass, discard, or clip each primitive and, for each primitive to be clipped, determines coordinates and interpolation coefficients for new vertices resulting from the 3-D clipping. The processing by unit 220 for 3-D clipping is described below.

Unit 250 computes attribute component values for new vertices from the 3-D clipping. Unit 250 may perform this computation using a processing unit (e.g., an ALU) used for attribute gradient setup and attribute interpolation. Unit 250 may then perform attribute gradient setup and attribute interpolation for new primitives along with other primitives.

Performing 3-D clipping as shown in FIG. 2 may provide certain advantages such as (a) improved performance by performing 3-D clipping in hardware, (b) small additional hardware cost to support 3-D clipping by borrowing processing units used for other graphics functions, (c) less disruption to the 3-D graphics pipeline by not having to call a CPU or DSP to perform 3-D clipping, and (d) possibly other benefits.

Figure 3:
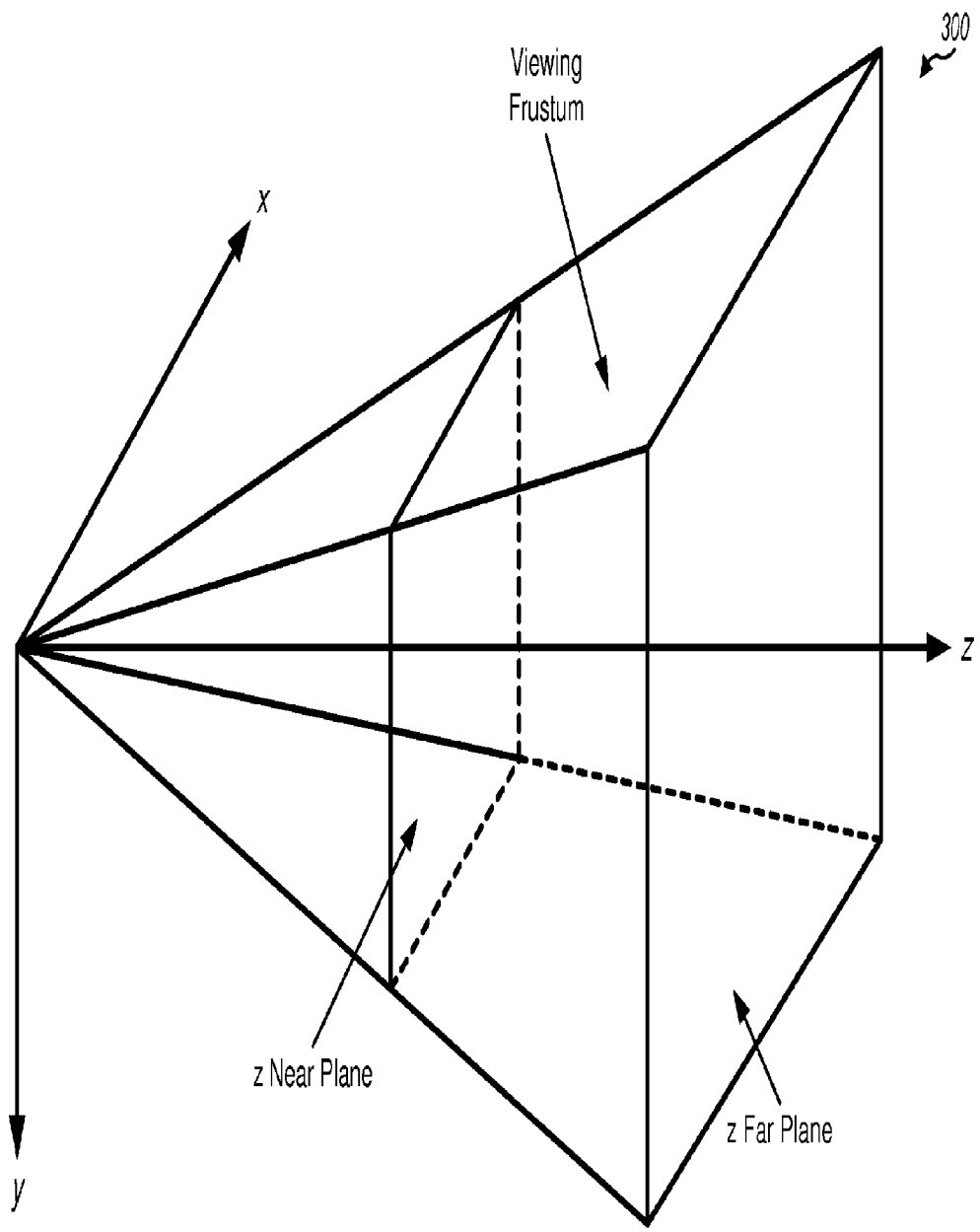
FIG. 3 shows a viewing frustum for 3-D graphics.

FIG. 3 shows a viewing frustum 300 for 3-D graphics. A camera for a rendering engine is located at the origin of a 3-D (x, y, z) coordinate system. The viewing frustum is a 3-D volume of space in a modeled world that might be displayed on a screen. The viewing frustum resembles a clipped pyramid and is formed by six planes—four planes for the four sides of the clipped pyramid, one plane (called the z near plane) for the clipped top of the pyramid, and another plane (called the z far plane) for the base of the pyramid. Objects outside the viewing frustum are not rendered and may be discarded. The z far plane may be placed at an infinite distance so that objects can be rendered regardless of their distance to the camera. In this case, the viewing frustum is formed by four planes for the four sides and the z near plane.

Figure 4:
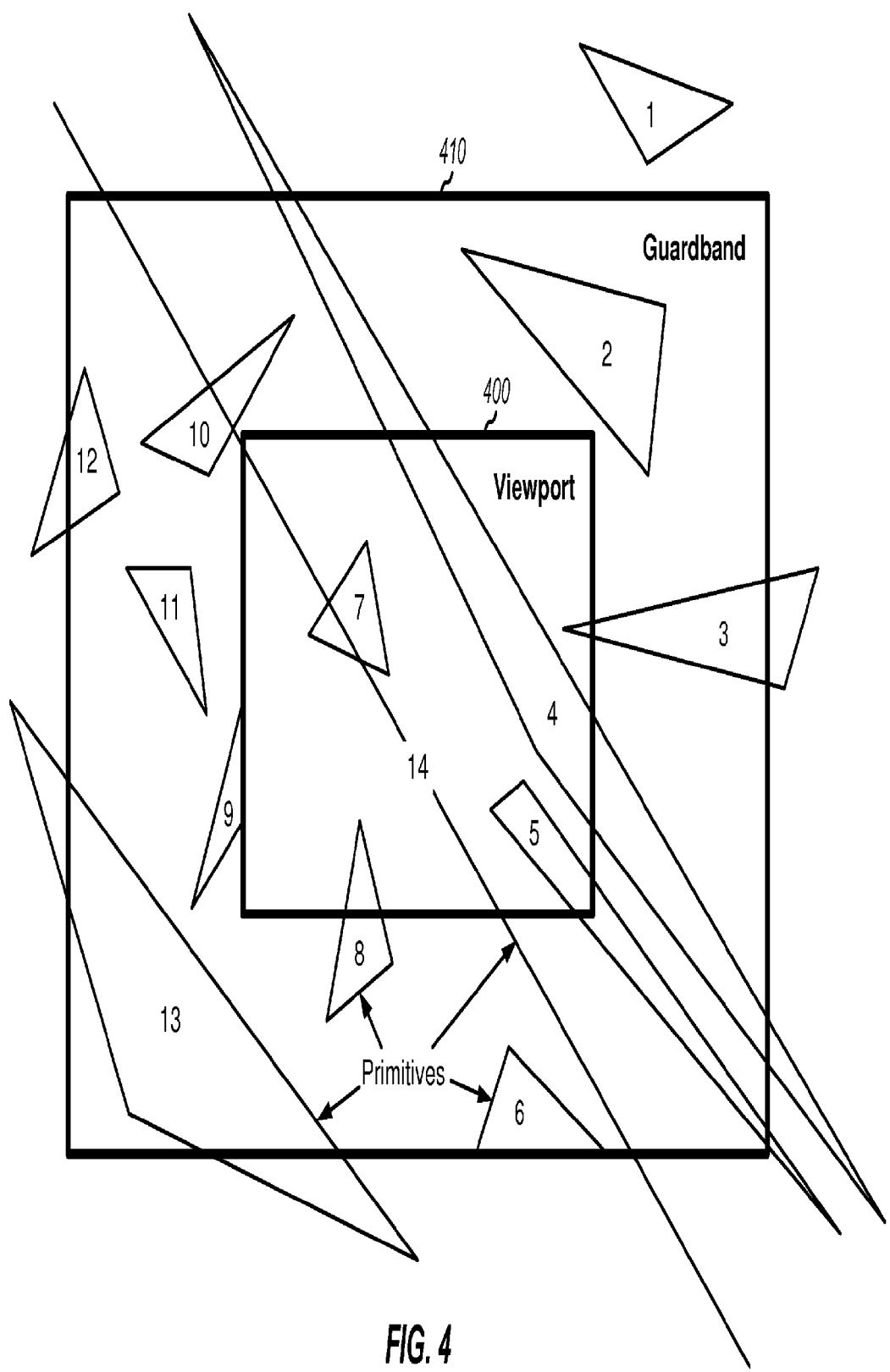
FIG. 4 shows primitives against a viewport.

FIG. 4 shows various primitives against a viewport 400. A viewport is a 2-D rectangle into which a 3-D scene is projected and may correspond to the base of a viewing frustum. The z near plane is present but not shown in the 2-D representation in FIG. 4. A guardband 410 is a rectangle that is equal to or larger than the viewport. 3-D clipping may be performed against the guardband instead of the viewport. A larger guardband may result in fewer primitives being clipped (which is desirable) but also result in more of the clipped primitives being passed to the next stage. The converse is true for a smaller guardband.

In one design, a primitive is discarded if all of its vertices are outside any one of the five planes for the viewport. A primitive that is not discarded is clipped if any vertex is outside any one of the five planes for the guardband. A primitive is passed if it is not discarded or clipped. In the example shown in FIG. 4, primitives 1, 6, 9, 11 and 12 are discarded, primitives 2, 7, 8 and 10 are passed, and primitives 3, 4, 5, 13 and 14 are clipped. Primitives may also be discarded, passed, or clipped based on other criteria.

3-D clipping may be performed as follows:
1. Determine clip codes for each vertex of each primitive,
2. Make clipping decision for each primitive and decide whether to pass, discard, or clip the primitive based on the clip codes for all vertices of the primitive,
3. Compute coordinates of new vertices for each clipped primitive, and
4. Compute attribute component values for new vertices of each clipped primitive.

Unit 220 within GPU 200 in FIG. 2 may perform steps 1, 2 and 3 (e.g., prior to performing viewport transformation and triangle setup), as described below. Clipping a primitive may result in one or more new vertices at the intersection of one or more clipping planes. For example, clipping triangle 4 in FIG. 4 against the guardband would result in two new vertices against the top plane and two new vertices against the right plane. The clipped triangle would be a polygon with five vertices, which may be divided into three new triangles. Unit 220 computes vertex coordinates for new primitives. These new primitives are passed to and processed by subsequent stages of the 3-D graphics pipeline in similar manner as primitives that are passed by the 3-D clipping.

Unit 250 of GPU 200 may perform step 4 as described below. The computation of attribute component values for new vertices may be deferred to unit 250 in order to save computation for vertices that may be rejected by units 220, 130, and/or 140. The new vertices attribute computation may be deferred since units 220, 130 and 140 in pipeline 200 do not operate on attributes. Alternatively, unit 220 may also compute attribute component values for the new vertices.

Primitives may be clipped against the guardband, which may be defined relative to the viewport by three guardband parameters GB_Scale_X, GB_Scale_Y, and GB_Scale_Z for x, y and z coordinates, respectively. GB_Scale_X is the ratio of the guardband size to the viewport size for the x direction. GB_Scale_X is equal to 1.0 if the guardband size is the same as the viewport size and is greater than 1.0 if the guardband size is larger than the viewport size. GB_Scale_Y and GB_Scale_Z are defined in similar manner for the y and z directions.

For 3-D clipping, clip codes are initially determined for each vertex of each primitive. A vertex may be defined by four components x, y, z, and w, where x, y, and z define the location of the vertex in 3-D space and w defines the perspective depth. For the guardband, the z near plane is given as —GB_Scale_Z*w, the left plane is given as —GB_Scale_X*w, the right plane is given as GB_Scale_X*w, the bottom plane is given as GB_Scale_Y*w, and the top plane is given as —GB_Scale_Y*w. The z far plane is ignored here because the possibility of clipping at the z far plane is low. Clipping with the z far plane may be equivalently performed in other ways by subsequent setup pipeline stages and is not described herein..

Figures 5, 6:
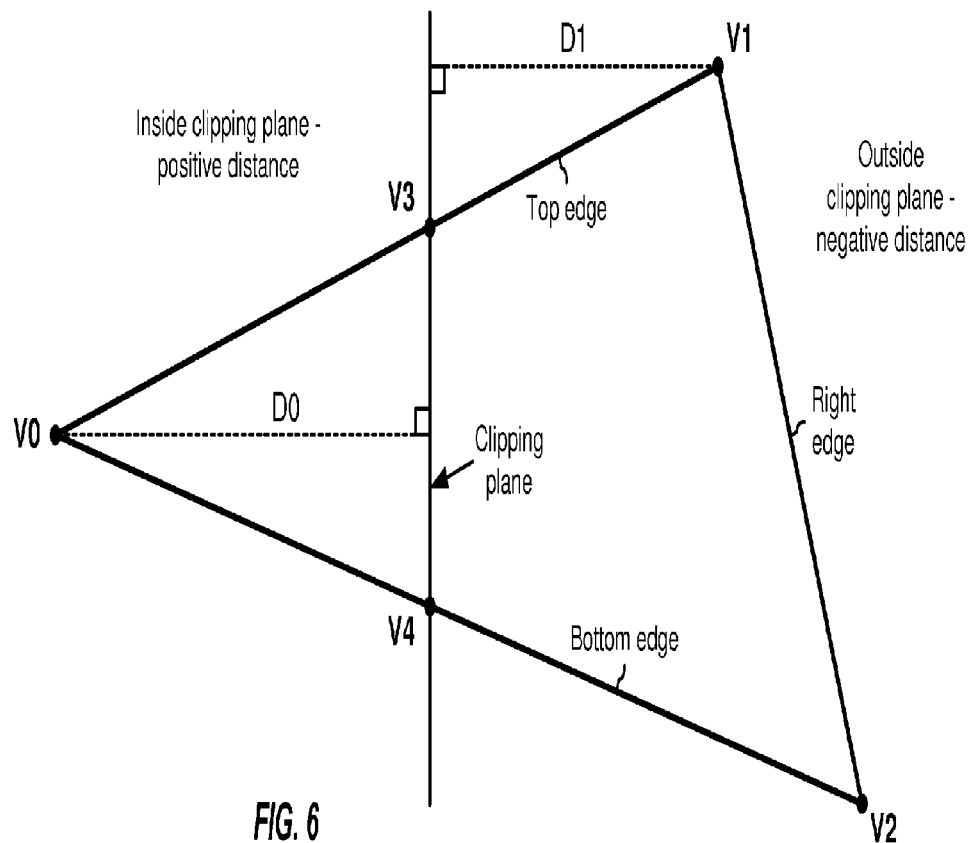
FIG. 5 shows a bitmap for clip codes for one vertex.
FIG. 6 illustrates clipping of a triangle against a clipping plane.

FIG. 5 shows a bitmap 500 for the clip codes for one vertex. The bitmap includes nine bits for nine clipping planes, one bit for each clipping plane. Bit 1 is for the z near plane and is applicable for both the viewport and guardband. Bits 2, 4, 6 and 8 are for the left, top, right and bottom planes, respectively, for the viewport. Bits 3, 5, 7 and 9 are for the left, top, right and bottom planes, respectively, for the guardband. Each bit in the bitmap may be set to one ('1') if the vertex is outside the corresponding clipping plane. A vertex that is outside a clipping plane for the guardband is also outside a corresponding clipping plane for the viewport. Hence, two bits (one for the guardband and another for the viewport) are set when a vertex is outside a clipping plane for the guardband. Only one bit is set when a vertex is between a clipping plane for the viewport and a corresponding clipping plane for the guardband.

The clip codes for a vertex may be determined based on the following pseudo-codes.

```
100     If (z < −GB_Scale_Z * w)  ClipCode = 0x2;     // z near plane
110     If (x < −GB_Scale_X * w)  ClipCode |= 0xc;    // guardband left plane
120           Else if (x < − w)   ClipCode |= 0x4;    // viewport left plane
130     If (y < −GB_Scale_Y * w)  ClipCode |= 0x30;   // guardband top plane
140           Else if (y < − w)   ClipCode |= 0x10;   // viewport top plane
150     If (x > GB_Scale_X * w)   ClipCode |= 0xc0;   // guardband right plane
160           Else if (x > w)     ClipCode |= 0x40;   // viewport right plane
170     If (y > GB_Scale_Y * w)   ClipCode |= 0x300;  // guardband bottom plane
180           Else if (y > w)     ClipCode |= 0x100;  // viewport bottom plane
```

In the pseudo-codes, "|=" denotes a bit-wise OR operation of the current value with the value to the right of "|=".

In the above pseudo-codes, line 100 sets bit 1 of the bitmap to one ('1') if the vertex is behind the z near plane. Line 110 sets bits 2 and 3 if the vertex is outside (or left of) the left plane of the guardband. Line 120 sets bit 2 if the vertex is between the left planes of the viewport and guardband. Line 130 sets bits 4 and 5 if the vertex is above the top plane of the guardband. Line 140 sets bit 4 if the vertex is between the top planes of the viewport and guardband. Line 150 sets bits 6 and 7 if the vertex is outside (or right of) the right plane of the guardband. Line 160 sets bit 6 if the vertex is between the right planes of the viewport and guardband. Line 170 sets bits 8 and 9 if the vertex is below the bottom plane of the guardband. Line 180 sets bit 8 if the vertex is between the bottom planes of the viewport and guardband.

A clipping decision is made for each primitive based on the clip codes for all vertices of the primitive. The clipping decision may be obtained based on the following pseudo-codes.

```
200     Clip_And = V0.ClipCode AND V1.ClipCode AND V2.ClipCode;
210     Clip_Or = V0.ClipCode OR V1.ClipCode OR V2.ClipCode;
220     If (Clip_And ≠ 0) Discard the primitive;
230     Else if (Clip_Or AND 0x2AA) Clip the primitive;
240     Else Pass the primitive;
```

In the above pseudo-codes, V0.ClipCode is the bitmap with the clip codes for a first vertex of a primitive, V1.ClipCode is the clip code bitmap for a second vertex, and V2.ClipCode is the clip code bitmap for a third vertex. If the primitive is a line, then only V0.ClipCode and V1.ClipCode for two vertices are used. If the primitive is a point, then only V0.ClipCode for one vertex is used. Line 200 performs a bit-wise logical AND of the three clip code bitmaps for the three vertices of the primitive. Line 210 performs a bit-wise logical OR of the three clip code bitmaps for the primitive.

Line 220 discards the primitive if all three vertices are outside any of the clipping planes for the viewport. Line 230 clips the primitive if it is not discarded and any vertex is outside any clipping plane for the guardband. Line 240 passes the primitive if it is not discarded or clipped.

For 3-D clipping, a primitive may be clipped against the five clipping planes for the guardband, one clipping plane at a time. For each clipping plane, each edge of the primitive may be examined to determine whether to pass, discard, or clip the edge against the clipping plane. For each edge to be clipped, a new vertex is determined for the intersection between that edge and the clipping plane, the vertex that is outside the clipping plane is dropped, and the new vertex is added.

FIG. 6 illustrates clipping of one triangle against one clipping plane. The triangle has three vertices labeled as V0, V1 and V2. Whether the top edge between vertices V0 and V1 should be clipped may be determined as follows. A signed distance D0 between vertex V0 and the clipping plane may be obtained by a dot product of vertex V0 coordinates and the clipping plane coefficients, or DP4 (C0, CP) where DP4 denotes a four-element dot product, C0 includes the (x, y, z, w) coordinates of vertex V0, and CP includes the (x, y, z, w) coefficients of the clipping plane. A signed distance (D1) between vertex V1 and the clipping plane may also be obtained by a dot product of vertex V1 coordinates and the clipping plane coefficients. The signed distance for a vertex is positive if the vertex is inside the clipping plane and is negative if the vertex is outside the clipping plane. The two vertices may be (a) retained if their distances are both positive, (b) discarded if their distances are both negative, or (c) clipped if one distance is positive and the other distance is negative.

If vertex V0 is inside the clipping plane (with positive D0) and vertex V1 is outside the clipping plane (with negative D1), as shown in FIG. 6, then the edge may be clipped by computing an interpolation coefficient t, as follows:

$$t = \frac{-D1}{D0 - D1}. \quad \text{Eq (1)}$$

The coordinates of a new vertex V3 at the intersection of the clipping plane and the edge may be computed as follows:

$$C3 = C0*t + C1*(1-t), \quad \text{Eq (2)}$$

where C0, C1, and C3 are the coordinates of vertices V0, V1 and V3, respectively. If the clipping plane is closer to vertex V0 than vertex V1, then t will be larger, and more weight will be given to C0 than C1. The converse is true if the clipping plane is closer to V1 than V0.

If vertex V1 is inside the clipping plane (with positive D1) and vertex V0 is outside the clipping plane (with negative D0), which is not shown in FIG. 6, then an interpolation coefficient t' may be computed as follows:

$$t' = \frac{-D0}{D1 - D0}. \quad \text{Eq. (3)}$$

The coordinates of the new vertex V3 may then be computed as follows:

$$C3 = C1*t' + C0*(1-t'). \quad \text{Eq (4)}$$

In equations (1) through (4), the new vertex is interpolated from the inside vertex to the outside vertex. The equations for the interpolation coefficient and the new vertex coordinates are dependent on which vertex is inside and which vertex is outside the clipping plane.

The bottom edge of the triangle in FIG. 6 may be clipped in similar manner as the top edge to obtain a new vertex V4. The two vertices for the right edge are outside the clipping plane and would have negative distances. These two vertices would be discarded. A new triangle is formed by existing vertex V0 and new vertices V3 and V4. This new triangle may be clipped against another clipping plane.

3-D clipping for a primitive (e.g., a triangle) may be performed in five clipping passes for the five clipping planes. Table 1 lists the five clipping planes, the order in which clipping may be performed, and the coefficients for each clipping plane. In this design, clipping is performed against the z near plane, then the left plane, then the top plane, then the right plane, and finally the bottom plane. Clipping may also be performed in other orders.

TABLE 1

| Clipping Order | Clipping Plane | Clipping Plane Coefficients |
|---|---|---|
| 1 | z Near Plane | (0.0, 0.0, 1.0, -GB_Scale_Z) |
| 2 | Left Plane | (1.0, 0.0, 0.0, GB_Scale_X) |
| 3 | Top Plane | (0.0, 1.0, 0.0, GB_Scale_Y) |
| 4 | Right Plane | (-1.0, 0.0, 0.0, GB_Scale_X) |
| 5 | Bottom Plane | (0.0, -1.0, 0.0, GB_Scale_Y) |

In general, a polygon may be clipped against a clipping plane by (a) traversing around the edges of the polygon and (b) clipping each edge against the clipping plane. For each edge, a determination is first made whether that edge is intersected by the clipping plane and, if yes, a new vertex is computed for the intersection point and replaces the vertex that is outside the clipping plane. The number of vertices may grow after clipping against the clipping plane.

Figure 7:
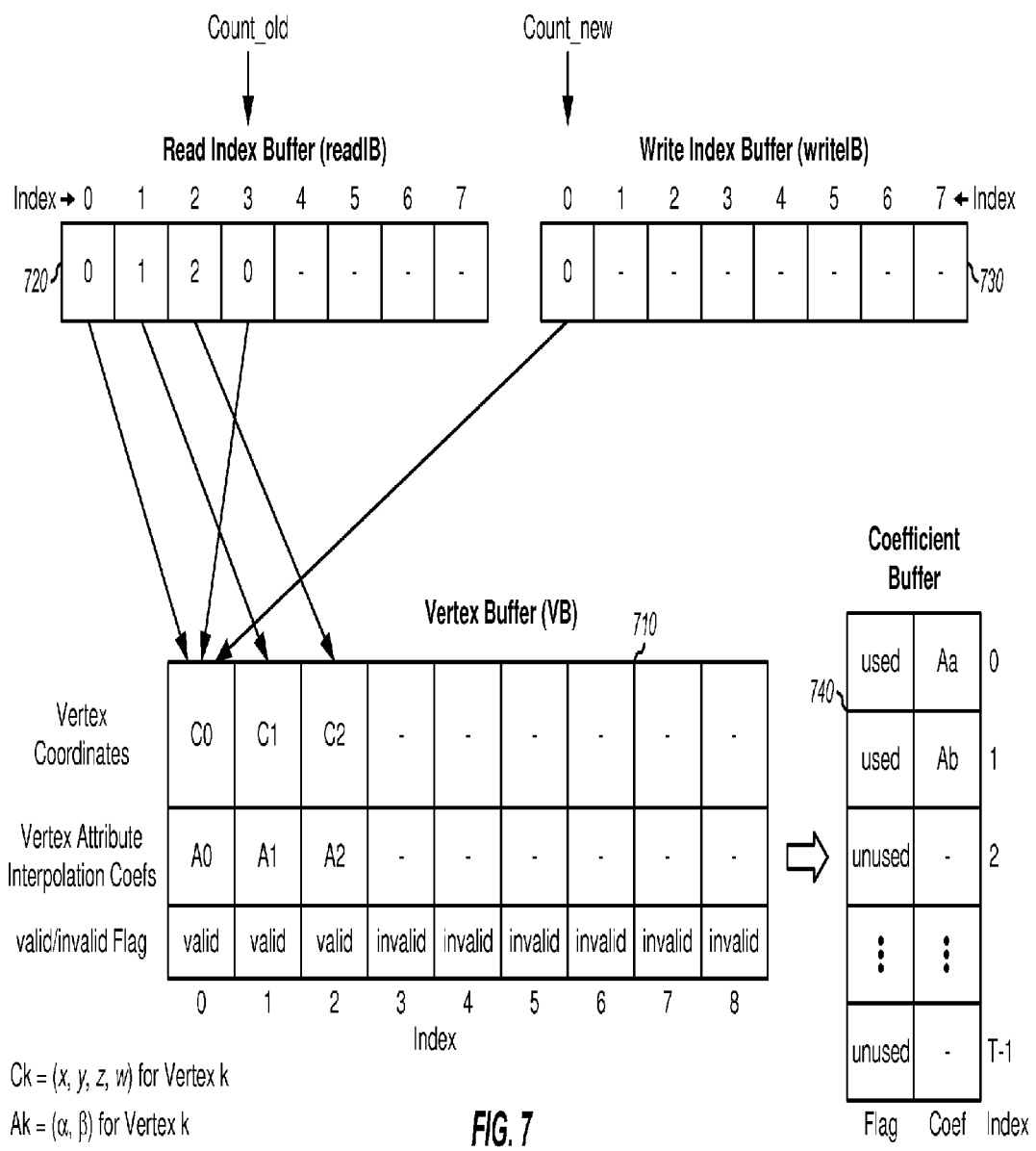
FIG. 7 shows a design of buffers used for 3-D clipping.

FIG. 7 shows a design of buffers used for 3-D clipping of a primitive, e.g., a triangle or line. Up to eight vertices may be obtained for the primitive during the 3-D clipping process. A vertex buffer 710 stores vertex coordinates and attribute interpolation coefficients for the primitive to be clipped. Vertex buffer 710 has nine locations with indices of 0 through 8. Each vertex buffer location can store (x, y, z, w) coordinates and attribute interpolation coefficients (α, β) for one vertex. Each vertex buffer location also has a valid/invalid flag that indicates whether that buffer location is storing a valid vertex. Vertex buffer 710 is initialized prior to the first clipping pass and is updated during and after each clipping pass.

A read index buffer 720 stores indices for vertices of the primitive at the start of a clipping pass. These indices point to the locations of vertex buffer 710 where the vertices are stored. Read index buffer 720 has eight locations with indices of 0 through 7. Each read index buffer location may store a pointer (or index) for one vertex buffer location. Read index buffer 720 is determined prior to each clipping pass.

A write index buffer 730 stores indices for vertices of the primitive during and after a clipping pass. Write index buffer 730 has eight locations with indices of 0 through 7. Each write index buffer location can store a pointer (or index) for one vertex buffer location. Write index buffer 730 is updated during and after each clipping pass.

A coefficient buffer 740 stores attribute interpolation coefficients for vertices. Coefficient buffer 740 includes T locations with indices of 0 through T-1, where T may be any value. Each coefficient buffer location can store attribute interpolation coefficients for one vertex. Each coefficient buffer location also has a used/unused flag that indicates whether that buffer location is storing coefficients for a valid vertex. After all five clipping passes are completed, the attribute interpolation coefficients for all valid vertices in vertex buffer 710 are saved in unused locations of coefficient buffer 740. If a given vertex is later discarded (e.g., by rasterizer 130 or early depth/stencil test unit 140 in FIG. 2), then the flag for the vertex is set to unused, and the buffer location may be used to store coefficients for another vertex.

Buffers 710, 720 and 730 are initialized prior to the first clipping pass for the z near plane. Buffer 710 may store vertex coordinates C0 and attribute interpolation coefficients A0 for vertex V0 in location 0, coordinates C1 and coefficients A1 for vertex V1 in location 1, and coordinates C2 and coefficients A2 for vertex V2 in location 2. Ck includes (x, y, z, w) coordinates for vertex Vk, and Ak includes ($\alpha$, $\beta$) coefficients for vertex Vk, for k=0, 1, 2. A0 is equal to (1.0, 0.0) for vertex V0, A1 is equal to (0.0, 1.0) for vertex V1, and A2 is equal to (0.0, 0.0) for vertex V2. Locations 0, 1 and 2 of buffer 710 are set to valid, and locations 3 through 8 are set to invalid. Read index buffer 720 stores vertex buffer indices 0, 1, 2, 0 (which are pointers to vertices V0, V1, V2, and V0 in buffer 710) in read index buffer locations 0, 1, 2, and 3, respectively. The four vertex buffer indices 0, 1, 2, 0 make one complete loop around the primitive to be clipped. A variable Count_old indicates the number of vertices at the start of a clipping pass and is initialized to three for a triangle. Write index buffer 730 is empty at the start of each clipping pass (not shown in FIG. 7). A variable Count_new indicates the number of vertices for the current clipping pass and is initialized to zero at the start of the clipping pass.

For a line, only two vertices V0 and V1 are present. Prior to the first clipping pass, location 0 of vertex buffer 710 stores C0 and A0 for the first vertex, and location 1 stores C1 and A1 for the second vertex. Read index buffer 720 stores 0 and 1 in the first two locations. Count_old is set to one.

The clipping of the primitive against the i-th clipping plane for the guardband, for i=0, . . . , 4, may be performed based on the following pseudo-codes.

In the above pseudo-codes, line 300 skips the clipping for the i-th plane if none of the vertices are outside the i-th plane. Lines 310 to 590 perform clipping against the i-th plane otherwise. Line 330 computes the signed distance between vertex V[0] and the i-th plane, where "[0]" denotes the vertex buffer index stored in location 0 of the read index buffer. Line 340 cycles through the remaining vertices in the read index buffer, for k=1, . . . , Count_old, and essentially traverses all of the edges of the primitive. Lines 350 to 490 perform clipping, if needed, for the k-th edge between vertices V[k-1] and V[k]. Line 350 computes the signed distance between vertex V[k] and the i-th plane.

Line 360 determines whether vertices V[k-1] and V[k] have positive distances and are both inside the i-th plane. If so, then line 370 saves vertex V[k-1] in the write index buffer.

Line 380 determines whether vertex V[k-1] is inside the i-th plane and vertex V[k] is outside the i-th plane. If so, then line 390 saves vertex V[k-1] in the write index buffer. Line 400 computes the interpolation coefficient as shown in equation (1). Line 410 computes the coordinates of a new vertex as shown in equation (2) and saves the new vertex coordinates in an empty location J of the vertex buffer. The new vertex coordinates are not saved over vertex V[k] coordinates, which are used for the next edge. The interpolation is performed from the inside to the outside the i-th plane and for six components x, y, z, w, $\alpha$, and $\beta$. Line 420 saves the new vertex in the write index buffer.

Line 430 determines whether vertex V[k-1] is outside the i-th plane and vertex V[k] is inside the i-th plane. If so, then line 440 computes the interpolation coefficient as shown in equation (3). Line 450 computes the coordinates of the new vertex as shown in equation (4) and saves the new vertex coordinates in an empty location J of the vertex buffer. Line 460 saves the new vertex instead of vertex V[k-1] in the write index buffer.

Line 470 is reached if vertices V[k-1] and V[k] are both outside the i-th plane. In this case, vertex V[k-1] is not saved.

```
300 If ((Clip_Or AND (2<<(2*i)))==0) Skip clipping for this plane;
310 Else {
320     Count_new = 0;
330     Last_dist = DP4(VB[readIB[0]], plane[i]);
340     For (k = 1; k ≤ Count_old) {
350         New_dist = DP4(VB[readIB[k]], plane[i]);
360         If (Last_dist ≥ 0 AND New_dist ≥ 0)            //V[k-1] & V[k] both inside plane
370             writeIB[Count_new++] = readIB[k-1];        //accept V[k-1] directly
380         Else (Last_dist ≥ 0 AND New_dist < 0) {        //V[k-1] inside & V[k] outside
390             writeIB[Count_new++] = readIB[k-1];        //accept V[k-1] directly
400             t = -New_dist / (Last_dist - New_dist);    //interpolate new vertex
410             VB[J] = VB[readIB[k-1]] * t + VB[readIB[k]] * (1-t);
420             writeIB[Count_new++] = J; }                //J is an empty location in VB
430         Else if (Last_dist < 0 AND New_dist ≥ 0){      // V[k-1] outside & V[k] inside
440             t = Last_dist / (Last_dist - New_dist);    // interpolate new vertex
450             VB[J] = VB[readIB[k]] * t + VB[readIB[k-1]] * (1-t);
460             writeIB[Count_new++] = J; }
470         Else                                           //V[k-1] & V[k] both outside
480             do nothing;
490         Last_dist = New_dist;   } }
500 If (triangle type) {                                   //triangle type
510     writeIB[Count_new] = writeIB[0];                   // may omit for last plane
520     If (Count_new < 3) Drop the primitive; }           //degenerate triangle now
530 Else if (New_dist ≥ 0) {                               //line type
540     writeIB[1] = readIB[1];   }
550 Else if (Count_new < 1) Drop the primitive;
560 Else Count_new = 1;
570 Update VB valid flags with writeIB;
580 Switch roles of readIB and writeIB;
590 Count_old = Count_new;
```

After all of the edges have been clipped against the i-th plane, line 490 saves the distance for vertex V[k] as the last distance for the next edge.

Lines 500 to 590 perform preparation for clipping against the next plane. If the primitive is a triangle, then line 510 saves vertex V[0] in the write index buffer as the last vertex. This forms a closed polygon with vertex V[0] as the first and last vertex for the polygon. Line 520 drops the primitive if the number of vertices is less than three. If the primitive is a line, then line 530 determines whether vertex V[1] is inside the i-th plane. If so, then line 540 saves vertex V[1] in the write index buffer. Line 550 determines whether the number of vertices is less than one and, if so, discards the primitive. Line 570 updates the vertex buffer by marking all locations that are not included in the write index buffer as invalid.

The roles of the read and write index buffers for the i-th plane are switched for the (i+1)-th plane by line 580. The write index buffer for the i-th plane is used as the read index buffer for the (i+1)-th plane, and the read index buffer for the i-th plane is used as the write index buffer for the (i+1)-th plane. The number of vertices after clipping against the i-th plane is used as the number of vertices at the start of the clipping pass for the (i+1)-th plane in line 590. Clipping for the (i+1)-th plane may then be performed in the same manner as for the i-th plane.

Referring to the example shown in FIG. 6, if vertex V0 is inside the clipping plane and vertices V1 and V2 are outside the clipping plane, then the contents of the vertex buffer, read index buffer, and write index buffer at the start and end of the clipping pass may be given as:

| Start of clipping pass | End of clipping pass |
| --- | --- |
| VB = {V0, V1, V2, x, x, x, x, x} | VB = {V0, x, x, V3, V4, x, x, x} |
| ReadIB = {0, 1, 2, 0, x, x, x, x} | ReadIB = {0, 1, 2, 0, x, x, x, x} |
| WriteIB = {x, x, x, x, x, x, x, x} | WriteIB = {0, 3, 4, 0, x, x, x, x} | where 'x' denotes an invalid entry. Locations 1 and 2 of the vertex buffer store vertices V1 and V2 during the clipping plane. These locations are marked as invalid by line 500 at the end of the clipping plane. The primitive is defined by vertices V0, V3 and V4 after clipping.

If vertex V0 is outside the clipping plane and vertices V1 and V2 are inside the clipping plane, then the contents of the buffers may be given as:

| Start of clipping pass | End of clipping pass |
| --- | --- |
| VB = {V0, V1, V2, x, x, x, x, x} | VB = {x, V1, V2, V3, V4, x, x, x} |
| ReadIB = {0, 1, 2, 0, x, x, x, x} | ReadIB = {0, 1, 2, 0, x, x, x, x} |
| WriteIB = {x, x, x, x, x, x, x, x} | WriteIB = {3, 1, 2, 4, 3, x, x, x} |

The primitive is defined by four vertices V3, V1, V2 and V4 after clipping.

After clipping against all five planes, the result may be a polygon with more than three vertices. In this case, new triangles may be formed for the polygon using the coordinates of valid vertices stored in the vertex buffer. All triangles generated by the 3-D clipping may be sent to the next stage in the pipeline. The attribute interpolation coefficients for new vertices may be stored in the coefficient buffer for use by unit 250.

Unit 250 computes attribute component values for new vertices generated by the 3-D clipping. Unit 250 may compute these attribute component values prior to performing attribute gradient setup and attribute interpolation. Unit 250 may also borrow ALU(s) used for attribute gradient setup and attribute interpolation to perform the new vertex attribute computation.

Unit 250 may compute attribute component values for new vertices as follows. If a constant attribute interpolation mode is selected, then the attribute component values for a new vertex are set to the attribute component values for a leading vertex. Otherwise, linear interpolation may be performed with the coefficients ($\alpha$, $\beta$) stored in coefficient buffer 740, as follows:

$$newV.comp[j]=V0.comp[j]*\alpha+V1.comp[j]*\beta+V2.comp[j]*(1-\alpha-\beta), \quad \text{Eq (5)}$$

where Vk.comp[j] is the j-th component for vertex Vk, for k=0, 1, 2, and newV.comp[j] is the j-th component for the new vertex.

In equation (5), vertices V0, V1 and V2 are the vertices of the original primitive that was clipped and resulted in the new vertex. The attribute component values for the new vertex are determined based on the attribute component values for vertices V0, V1 and V2 (which may be provided by vertex cache 180) and the interpolation coefficients $\alpha$ and $\beta$ computed for the new vertex (which are stored in coefficient buffer 740). The computation in equation (5) may be performed for each attribute component. The attribute component values for the new vertices may be passed to the attribute gradient setup and attribute interpolation.

Unit 250 may first compute attribute component values for all components for all new vertices and then perform attribute gradient setup and attribute interpolation. Alternatively, unit 250 may process one or few components at a time. For each subset of component(s), unit 250 may perform new vertex attribute computation for this subset of component(s) followed by attribute gradient setup and attribute interpolation.

The design shown in FIG. 2 efficiently performs 3-D clipping using processing units used for other 3-D graphics functions. The clipping of primitives against clipping planes may be performed by borrowing ALU(s) used for viewport transformation in unit 220. The new vertex attribute computation may be performed by borrowing ALU(s) used for attribute gradient setup and attribute interpolation in unit 250. The likelihood of having to clip primitives may be low (e.g., few percents) when an appropriate guard band size is used. In this case, reusing the ALUs to perform 3-D clipping may minimally affect performance.

Little additional hardware may be sufficient to support 3-D clipping in hardware. Some small multiplies with GB_Scales and some comparators may be used to generate clip codes and make clipping decisions. Few small buffers 710, 720, 730 and 740 may be used to store immediate results of the clipping against planes and to store attribute interpolation coefficients for new vertices.

Figure 8:
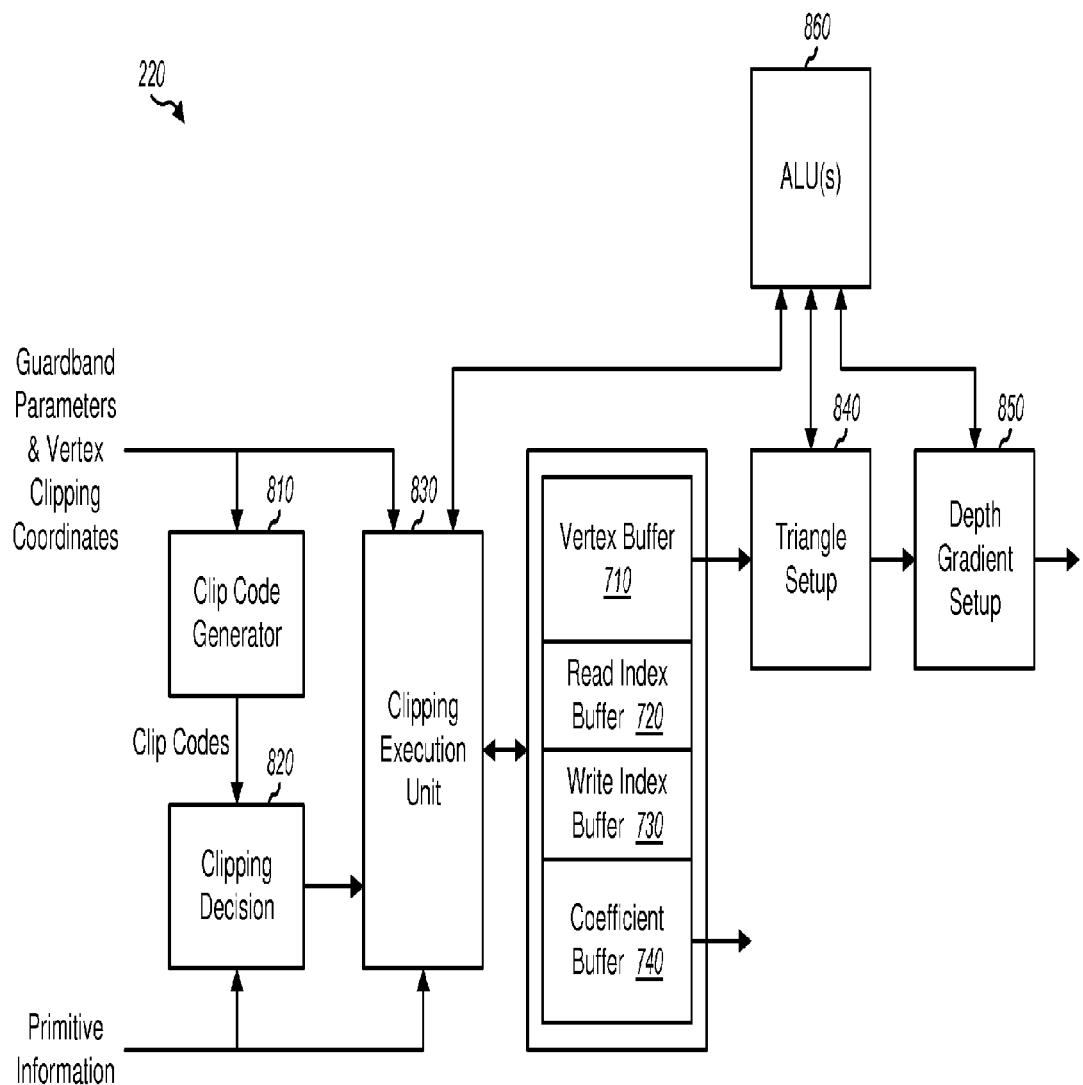
FIG. 8 shows a block diagram of unit 220 in the GPU in FIG. 2.

FIG. 8 shows a block diagram of a design of 3-D clipping, triangle setup, and depth gradient setup unit 220 within GPU 200 in FIG. 2. A clip code generator 810 receives coordinates of vertices in clipping space (or vertex clipping coordinates) and guardband parameters such as GB_Scale_X, GB_Scale_Y, and GB_Scale_Z. Unit 810 generates clip codes for each vertex, e.g., as described above with lines 100 to 180 of the pseudo-codes. A unit 820 receives the clip codes for vertices and primitive information indicating the vertices of each primitive. Unit 820 makes clipping decision for each primitive based on the clip codes for all vertices of the primitive, e.g., as described above with lines 200 to 240 of the pseudo-codes. A clipping execution unit 830 passes, discards or clips each primitive based on the clipping decision provided by unit 820 and provides vertex coordinates to vertex buffer 710. For each primitive to be clipped, unit 830 clips the primitive based on the guardband parameters and the vertex coordinates, e.g., as described above with lines 300 to 590 of the pseudo-codes.

A unit 840 performs viewport transform, triangle setup and possibly other graphics functions (e.g., scissoring and back face culling) for primitives provided by unit 830 and stored in vertex buffer 710. A unit 850 computes depth gradient coefficients for primitives. One or more ALUs 860 are used by triangle setup unit 840 and depth gradient setup unit 850. ALU(s) 860 may be borrowed by clipping execution unit 830 and used to perform clipping.

Figure 9:
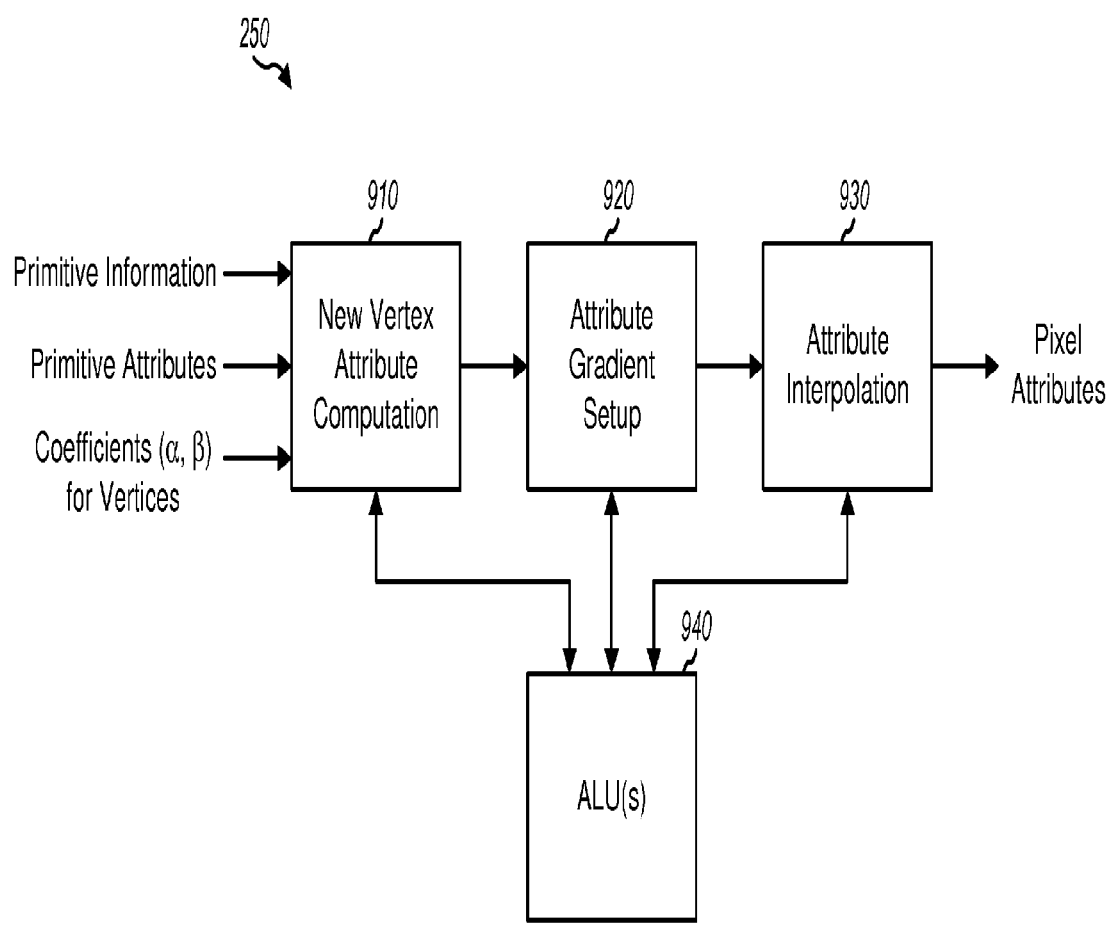
FIG. 9 shows a block diagram of unit 250 in the GPU in FIG. 2.

FIG. 9 shows a block diagram of a design of new vertex attribute computation, attribute gradient setup, and attribute interpolation unit 250 within GPU 200 in FIG. 2. A new vertex attribute computation unit 910 receives primitive information, attribute component values for vertices of primitives, and coefficients ($\alpha$, $\beta$) for new vertices. Unit 910 computes attribute component values for each new vertex, e.g., as shown in equation (5). A unit 920 computes attribute gradients based on the attribute component values for vertices. A unit 930 computes attribute component values for each pixel within each primitive based on that pixel's screen coordinates and the attribute gradients. One or more ALUs 940 are used by attribute gradient setup unit 920 and attribute interpolation unit 930. ALU(s) 940 may be borrowed by new vertex attribute computation unit 910 and used to compute attribute component values for new vertices.

In the design shown in FIG. 8, 3-D clipping is performed prior to viewport transformation by triangle setup unit 840 within unit 220. Scissoring and back face culling may then be performed by unit 840 on primitives in screen space after the viewport transformation. In another design, 3-D clipping is deferred and performed after the viewport transformation. Some primitives may be discarded by the back face culling, which may then reduce the number of primitives to process for 3-D clipping. Primitives may be stored in a buffer (e.g., vertex cache 180) until the back face culling is completed, and primitives not discarded by the back face culling may be retrieved from the buffer and subjected to 3-D clipping. Alternatively, primitives that pass the back face culling may be transformed back from screen space to clipping space and subjected to 3-D clipping.

The 3-D clipping techniques described herein may be used for wireless communication devices, handheld devices, gaming devices, computing devices, consumer electronics devices, etc. An exemplary use of the techniques for a wireless communication device is described below.

Figure 10:
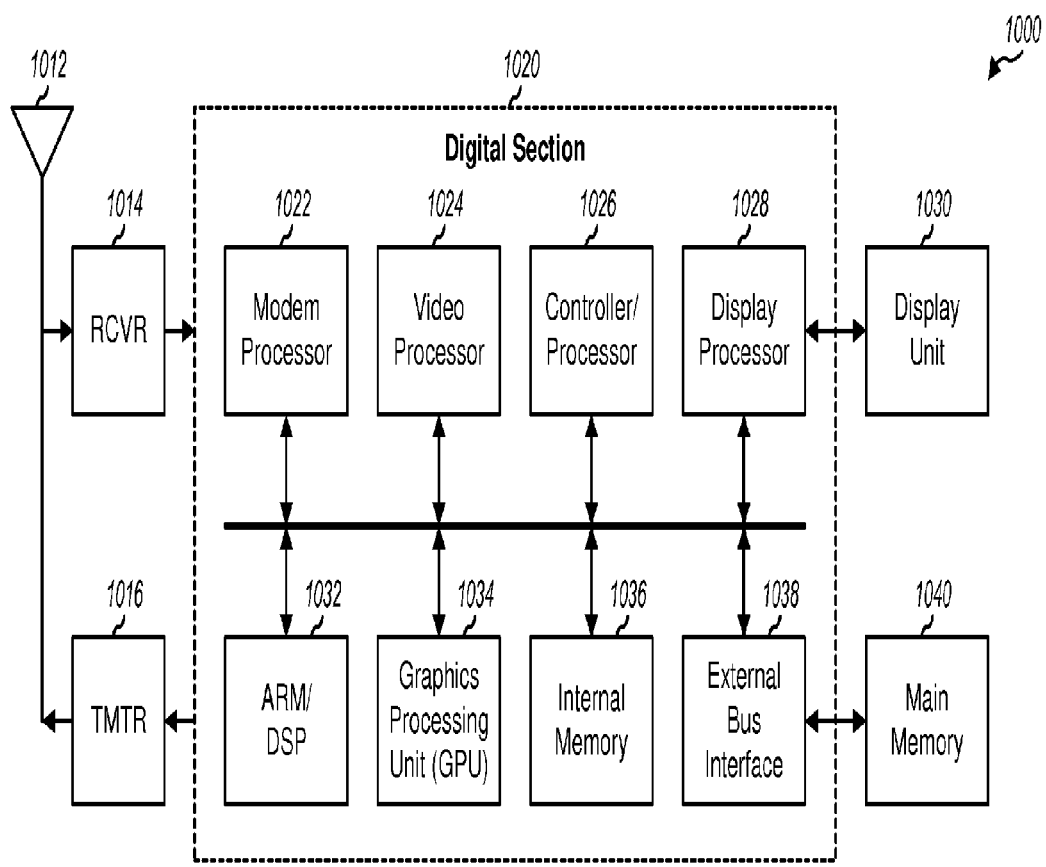
FIG. 10 shows a block diagram of a wireless communication device.

FIG. 10 shows a block diagram of a design of a wireless communication device 1000 in a wireless communication system. Wireless device 1000 may be a cellular phone, a computer, a terminal, a handset, a personal digital assistant (PDA), or some other device. The wireless communication system may be a Code Division Multiple Access (CDMA) system, a Global System for Mobile Communications (GSM) system, or some other system.

Wireless device 1000 is capable of providing bi-directional communication via a receive path and a transmit path. On the receive path, signals transmitted by base stations are received by an antenna 1012 and provided to a receiver (RCVR) 1014. Receiver 1014 conditions and digitizes the received signal and provides samples to a digital section 1020 for further processing. On the transmit path, a transmitter (TMTR) 1016 receives data to be transmitted from digital section 1020, processes and conditions the data, and generates a modulated signal, which is transmitted via antenna 1012 to the base stations.

Digital section 1020 includes various processing, interface and memory units such as, for example, a modem processor 1022, a video processor 1024, a controller/processor 1026, a display processor 1028, an advance RSIC machine/digital signal processor (ARM/DSP) 1032, a GPU 1034, an internal memory 1036, and an external bus interface (EBI) 1038. Modem processor 1022 performs processing for data transmission and reception (e.g., encoding, modulation, demodulation, and decoding). Video processor 1024 performs processing on video content (e.g., still images, moving videos, and moving texts) for video applications such as camcorder, video playback, and video conferencing. Controller/processor 1026 may direct the operation of various processing and interface units within digital section 1020. Display processor 1028 performs processing to facilitate the display of videos, graphics, and texts on a display unit 1030. ARM/DSP 1032 may perform various types of processing for wireless device 1000. GPU 1034 performs graphics processing and may implement GPU 200 in FIG. 2, buffers 710 to 740 in FIG. 7, unit 220 in FIG. 8, unit 250 in FIG. 9, etc. Internal memory 1036 stores data and/or instructions for various units within digital section 1020. EBI 1038 facilitates transfer of data between digital section 1020 (e.g., internal memory 1036) and a main memory 1040.

Digital section 1020 may be implemented with one or more DSPs, micro-processors, RISCs, etc. Digital section 1020 may also be fabricated on one or more application specific integrated circuits (ASICs) and/or some other type of integrated circuits (ICs).

The 3-D clipping techniques described herein may be implemented by various means. For example, these techniques may be implemented in hardware, firmware, software, or a combination thereof. For a hardware implementation, the units used to perform 3-D clipping (e.g., buffers 710 to 740 in FIG. 7, unit 220 in FIG. 8, unit 250 in FIG. 9, etc.) may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

The GPU and other units described herein may be stand-alone units or may be part of a device. The device may be (i) a stand-alone IC such as a graphics IC, (ii) a set of one or more ICs that may include memory ICs for storing data and/or instructions, (iii) an ASIC, such as a mobile station modem (MSM), with integrated graphics processing functions, (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:
1. A graphics processing unit comprising:
   a first hardware unit configured to perform using a first group of one or more shared arithmetic logic units:
      3-dimensional (3-D) clipping of primitives;
      triangle setup; and
      depth gradient setup;

a second hardware unit configured to perform using a second group of one or more shared ALUs:
attribute component value computations for new vertices resulting from the 3-D clipping;
attribute gradient setup; and
attribute interpolation; and
at least one buffer to store intermediate results of the 3-D clipping by the first hardware unit.

2. The graphics processing unit of claim 1, wherein the first group of one or more shared ALUs is used to perform 3-D clipping prior to triangle setup and rasterization.

3. The graphics processing unit of claim 2, wherein the second group of one or more shared ALUs is used to perform attribute component value computations for new vertices after depth and stencil tests and prior to attribute gradient setup and attribute interpolation.

4. The graphics processing unit of claim 1, wherein each of the primitives comprises at least one vertex, and wherein for each primitive the first hardware unit generates clip codes for each vertex of the primitive and determines whether to pass, discard or clip the primitive based on clip codes for all vertices of the primitive.

5. The graphics processing unit of claim 4, wherein the first hardware unit performs 3-D clipping against multiple clipping planes, and wherein the clip codes for each vertex indicate whether the vertex is inside or outside the multiple clipping planes.

6. The graphics processing unit of claim 5, wherein for each primitive the first hardware unit discards the primitive if all vertices of the primitive are outside at least one of clipping planes for a viewport, clips the primitive if at least one vertex of the primitive is outside clipping planes for a guardband, and passes the primitive otherwise.

7. The graphics processing unit of claim 4, the clip codes for each vertex are represented by a bitmap comprised of one bit for each of multiple clipping planes, and wherein for each vertex the first hardware unit determines a bit value for each clipping plane based on coordinates of the vertex and parameters for the clipping plane.

8. The graphics processing unit of claim 1, wherein for each primitive to be clipped, the first hardware unit clips the primitive against multiple clipping planes, one clipping plane at a time.

9. The graphics processing unit of claim 8, wherein the first hardware unit reuses the at least one buffer to store intermediate results of clipping against each of the multiple clipping planes.

10. The graphics processing unit of claim 8, wherein to clip a primitive against a clipping plane, the first hardware unit processes at least one edge of the primitive, one edge at a time, determines whether to clip each edge against the clipping plane, and determines a new vertex for each edge to be clipped against the clipping plane.

11. The graphics processing unit of claim 8, wherein to clip a primitive against a clipping plane, the first hardware unit computes distances between vertices of the primitive and the clipping plane using the first group of one or more shared ALUs, determines whether to clip edges of the primitive based on the distances, and computes coordinates of a new vertex for each edge to be clipped using the first group of one or more shared ALUs.

12. The graphics processing unit of claim 11, wherein the first hardware unit further computes interpolation coefficients for the new vertex for each edge to be clipped using the first group of one or more shared ALUs, the interpolation coefficients being used to compute attribute component values for the new vertex.

13. The graphics processing unit of claim 1, wherein the at least one buffer comprises a first buffer to store coordinates of vertices of a primitive being clipped.

14. The graphics processing unit of claim 13, wherein the first buffer further stores coefficients used to compute attribute component values for new vertices of the primitive being clipped.

15. The graphics processing unit of claim 13, wherein the at least one buffer further comprises:
a second buffer to store indices of vertices of the primitive prior to performing clipping against a clipping plane; and
a third buffer to store indices of vertices of the primitive during and after performing clipping against the clipping plane.

16. The graphics processing unit of claim 1, wherein the at least one buffer comprises a buffer to store coefficients used to compute attribute component values for new vertices of clipped primitives.

17. The graphics processing unit of claim 16, wherein coefficients for clipped primitives that are rejected in subsequent pipeline stages are released from the buffer.

18. The graphics processing unit of claim 1, wherein the first hardware unit comprises a clipping execution unit, a triangle setup unit, and a depth gradient setup unit, and wherein the clipping execution unit borrows one or more ALUs used by the triangle setup unit and the depth gradient setup unit.

19. The graphics processing unit of claim 1, wherein the second hardware unit comprises a new vertex attribute computation unit, an attribute gradient setup unit, and an attribute interpolation unit, and wherein the new vertex attribute computation unit borrows one or more ALUs used by the attribute gradient setup unit and the attribute interpolation unit.

20. An integrated circuit, comprising:
a first hardware unit configured to perform using a first group of one or more shared arithmetic logic units (ALUs):
3-dimensional (3-D) clipping of primitives;
triangle setup; and
depth gradient setup;
a second hardware unit configured to perform using a second group of one or more shared ALUs:
attribute component value computations for new vertices resulting from the 3-D clipping;
attribute gradient setup; and
attribute interpolation; and
at least one buffer to store intermediate results of the 3-D clipping by the first hardware unit.

21. The integrated circuit of claim 20, wherein each of the primitives comprises at least one vertex, and wherein for each primitive the first hardware unit generates clip codes for each vertex of the primitive, determines whether to pass, discard or clip the primitive based on clip codes for all vertices of the primitive, and clips the primitive against multiple clipping planes, one clipping plane at a time, if the primitive is to be clipped.

22. The integrated circuit of claim 20, wherein the at least one buffer stores coordinates of vertices of a primitive being clipped and coefficients used to compute attribute component values for new vertices of the primitive being clipped.

23. A method of graphics processing, comprising:
performing, by a first hardware unit, using a first group of one or more shared arithmetic logic units (ALUs):
3-dimensional (3-D) clipping of primitives;
triangle setup; and
depth gradient setup;

performing, by a second hardware unit, using a second group of one or more shared ALUs:
- attribute component value computations for new vertices resulting from the 3-D clipping;
- attribute gradient setup; and
- attribute interpolation; and storing intermediate results of the 3-D clipping in at least one buffer.

24. The method of claim 23, wherein each of the primitives comprises at least one vertex, and wherein the performing 3-D clipping comprises, for each primitive:
- generating clip codes for each vertex of the primitive;
- determining whether to pass, discard or clip the primitive based on clip codes for all vertices of the primitive; and
- clipping the primitive against multiple clipping planes, one clipping plane at a time, using the first group of one or more shared ALUs if the primitive is to be clipped.

25. A graphics processing unit, comprising:
a first hardware unit comprising a first shared means for performing:
- 3-dimensional (3-D) clipping of primitives;
- triangle setup; and
- depth gradient setup;

a second hardware unit comprising a second shared means for performing:
- attribute component value computations for new vertices resulting from the 3-D clipping;
- attribute gradient setup; and
- attribute interpolation; and means for storing intermediate results of the 3-D clipping.

26. A wireless device comprising:
a graphics processing unit operative to perform graphics operations and comprising:
- a first hardware unit configured to perform using a first group of one or more shared arithmetic logic units (ALUs):
  - 3-dimensional (3-D) clipping of primitives;
  - triangle setup; and
  - depth gradient setup;
- a second hardware unit configured to perform using a second group of one or more shared ALUs:
  - attribute component value computations for new vertices resulting from the 3-D clipping;
  - attribute gradient setup; and
  - attribute interpolation; and
- at least one buffer to store intermediate results of the 3-D clipping by the first hardware unit; and
- a memory to store data for the graphics processing unit.

27. A non-transitory computer-readable medium comprising instructions that are executable to:
perform, by a first hardware unit, using a first group of one or more shared arithmetic logic units (ALUs):
- 3-dimensional (3-D) clipping of primitives;
- triangle setup; and
- depth gradient setup;

perform, by a second hardware unit, using a second group of one or more shared ALUs:
- attribute component value computations for new vertices resulting from the 3-D clipping;
- attribute gradient setup; and
- attribute interpolation; and store intermediate results of the 3-D clipping in at least one buffer.

\* \* \* \* \*